No. 683,170. Patented Sept. 24, 1901.
H. C. CLAY.
SEPARATOR TOOTH.
(Application filed July 12, 1900.)
(No Model.)
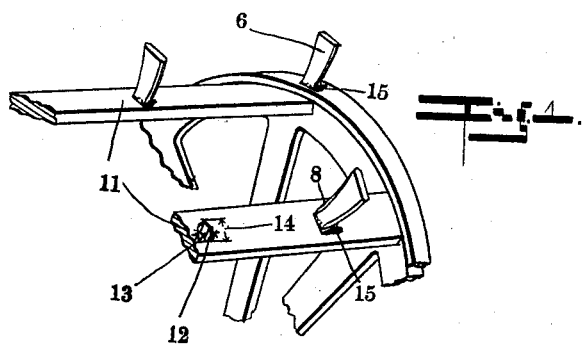
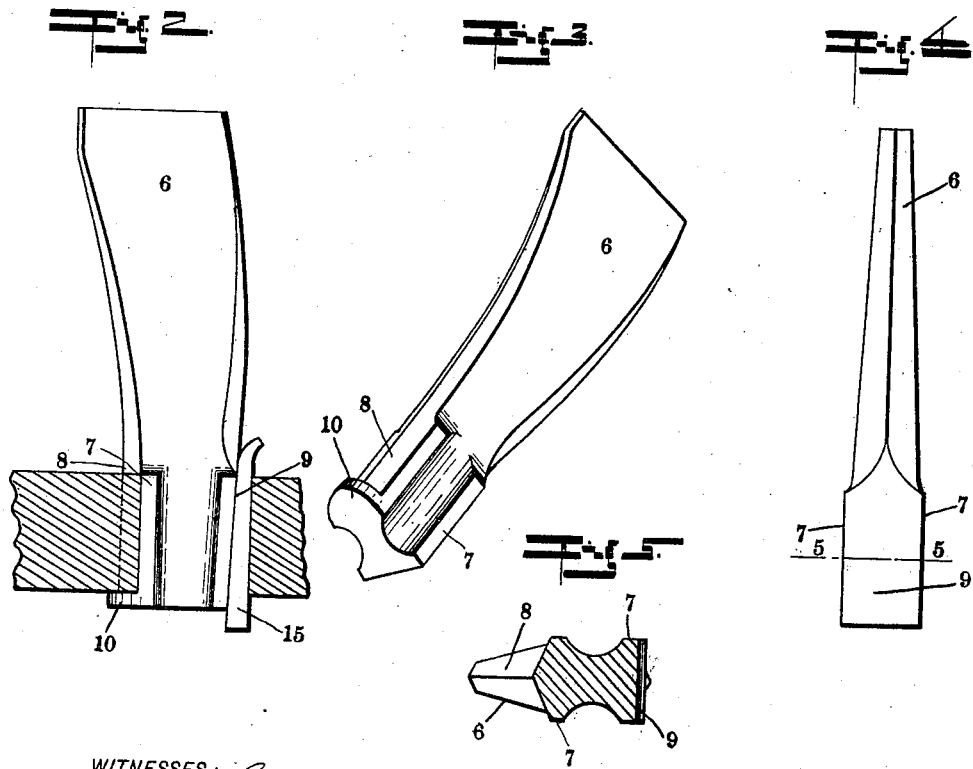
WITNESSES:
Frank A. Fahle
Bertha M. Ballard
INVENTOR
Harry C. Clay
BY
Arthur M. Hood
ATTORNEY

UNITED STATES PATENT OFFICE.

HARRY C. CLAY, OF COLUMBUS, INDIANA, ASSIGNOR TO REEVES & COMPANY, OF SAME PLACE.

SEPARATOR-TOOTH.

SPECIFICATION forming part of Letters Patent No. 683,170, dated September 24, 1901.

Application filed July 12, 1900. Serial No. 23,305. (No model.)

*To all whom it may concern:*

Be it known that I, HARRY C. CLAY, a citizen of the United States, residing at Columbus, in the county of Bartholomew and State of Indiana, have invented a new and useful Separator-Tooth, of which the following is a specification.

My invention relates to an improvement in insertible teeth for the cylinders and concaves of separators, &c.

Great difficulty has heretofore been experienced in providing a means for fastening the teeth in position so securely as to prevent them from working loose during operation and of such character that they may be easily removed and replaced.

The object of my present invention, therefore, is to produce teeth, together with a fastening means therefor, of such form that they may be easily inserted and removed and be so secured in position as to be free from probability of loosening during operation.

The accompanying drawings illustrate my invention.

Figure 1 is a perpective sectional view of a portion of a cylinder provided with my improved tooth. Fig. 2 is a section. Fig. 3 is perspective view of the tooth. Fig. 4 is a side elevation of the tooth. Fig. 5 is a transverse section on line 5 5 of Fig. 4.

In the drawings, 6 indicates the body or working end of the tooth, said body being of any desired form. The butt end or shank of said tooth is provided with parallel sides 7 7 and a side 8. The side opposite side 8 is slightly inclined inward, so as to form a slightly-tapering side 9, the purpose of which will appear. Extending from the bottom or lower end of side 8 at right angles thereto is a short lip 10. I have shown side 8 composed of two portions meeting on the medial line in an obtuse angle and the projecting lip 10 of a corresponding form; but it is to be understood that said side and lip may be made plain, if desired.

It has heretofore been deemed necessary to form a tapering socket or opening to receive the teeth; but this is objectionable for several reasons, especially because of the difficulty and expense of forming such a socket. The cylinders are commonly made in skeleton form of a series of transverse bars 11, of wrought-iron, securely bound together. For the reception of my tooth I perforate the bars 11 with a series of perforations 12 of the same general form as the cross-section of the shank of the tooth, the dimension 13 being equal to the distance between sides 7, while the dimension 14 is at least the length of lip 10 greater than the longest distance between sides 8 and 9. All of the sides of the perforations 12 are parallel to a common axis of perforation, so that said perforation may be formed by the action of a punch of the ordinary kind, and by this means a perfectly clean non-tapering opening formed. The tooth may be inserted in the bar from the outside and when so inserted may be then moved transversely, so as to cause lip 10 to take under the inner face of bar 11. The tooth is then secured in position by the insertion of a short wedge 15 from the inside, the thin edge of the wedge protruding slightly from the bar and being turned down, as shown. It will be readily understood that side 8 may be tapered in either direction, if so desired, and the corresponding side of the perforation also tapered without departing from my invention; but I do not recommend such practice, as no advantage is to be gained thereby.

I claim as my invention—

1. A separator-tooth provided with a shank having three sides parallel to a common axis, a lip projecting from the end of one of said sides, and a fourth side inclined toward said axis.

2. A separator-tooth provided with a shank having one side inclined to the axis of the tooth, and a lip projecting from the lower end of one of the other sides.

3. The combination with a supporting-bar having perforations formed therethrough with the walls of each of said perforations all parallel to the axis of perforation, of a tooth adapted to be inserted therein, said tooth being provided with a shank having all but one of its sides parallel to a common axis, the remaining side inclined to said axis, a lip projecting from one of the first-mentioned sides, and a wedge adapted to be inserted in said perforation so as to coöperate with the inclined side of the shank of the tooth.

4. A separator-tooth provided with a shank having one side inclined to the axis of the tooth and toward the end of the shank, and a lip projecting from the lower end of one of the other sides.

5. A separator-tooth provided with a shank having three sides parallel to a common axis, a lip projecting from the end of one of said sides, and a fourth side inclined toward said axis toward the end of the shank.

HARRY C. CLAY.

Witnesses:
ARTHUR M. HOOD,
BERTHA M. BALLARD.